D. G. ROOS
OILING DEVICE.
APPLICATION FILED APR. 13, 1918.
1,338,160.
Patented Apr. 27, 1920.
2 SHEETS—SHEET 1.
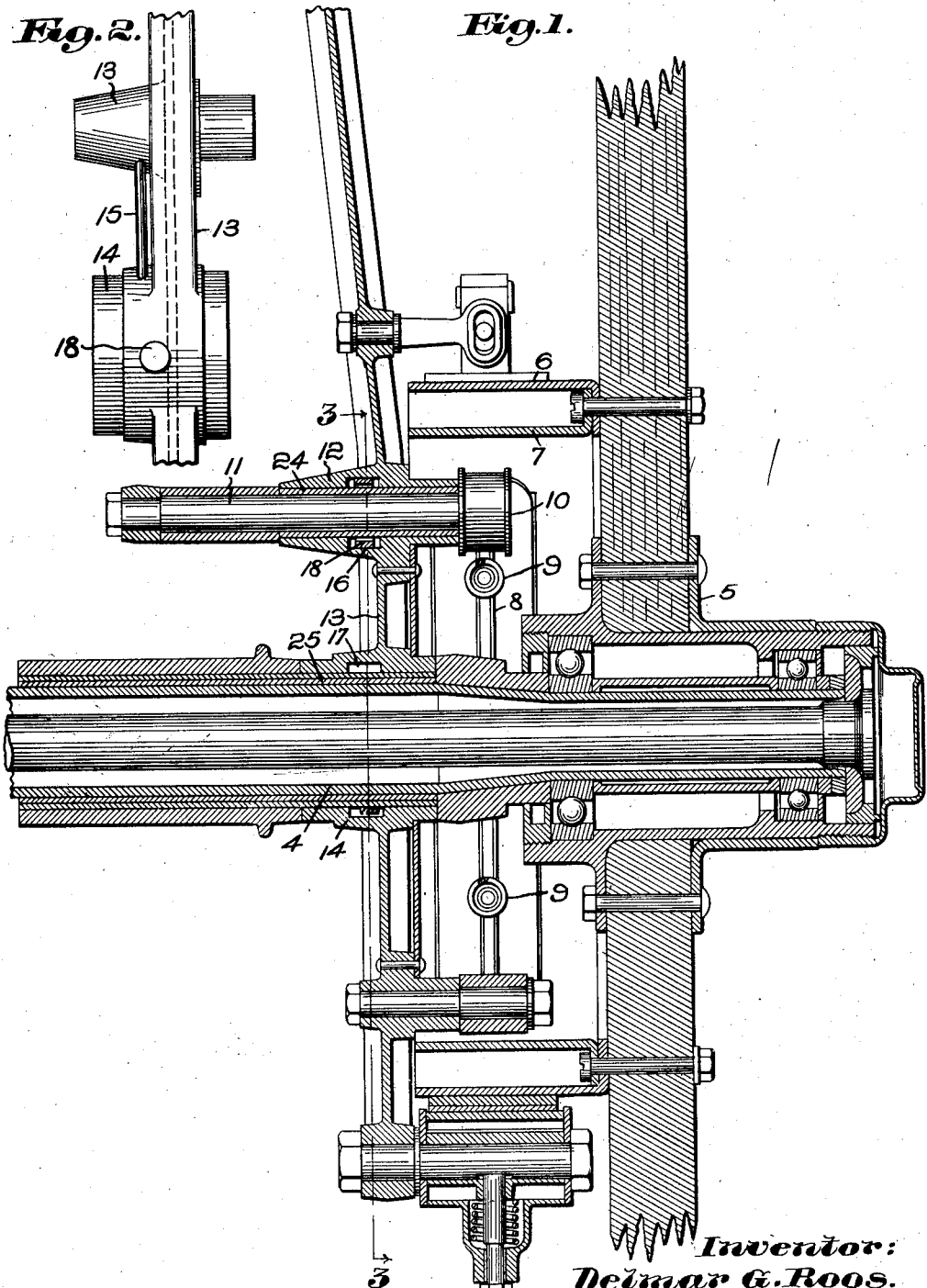
Inventor:
Delmar G. Roos.

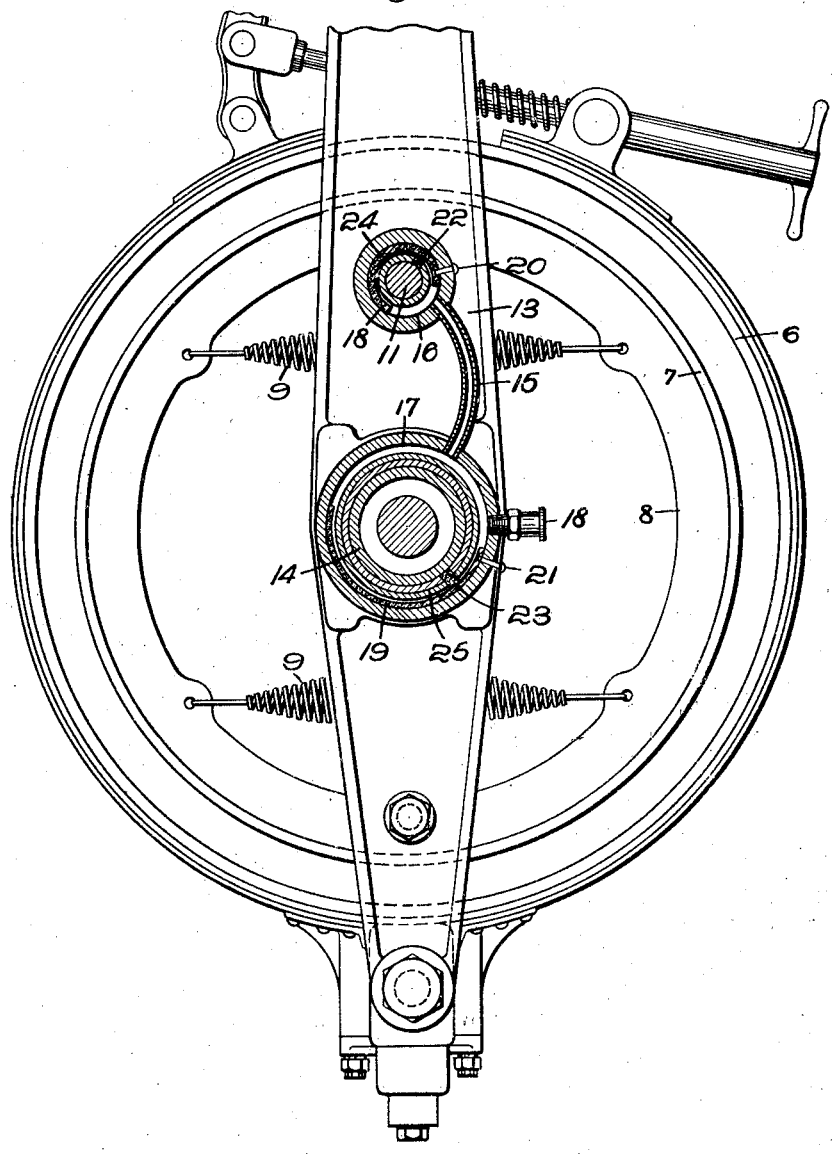

UNITED STATES PATENT OFFICE.

DELMAR G. ROOS, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

OILING DEVICE.

1,338,160.   Specification of Letters Patent.   Patented Apr. 27, 1920.

Application filed April 13, 1918. Serial No. 228,313.

*To all whom it may concern:*

Be it known that I, DELMAR G. ROOS, a citizen of the United States, and a resident of Bridgeport, in the county of Fairfield and State of Connecticut, have invented an Improvement in Oiling Devices, of which the following description, in connection with the accompanying drawings, is a specification, like characters on the drawings representing like parts.

This invention relates to oiling devices, and is more particularly concerned with means for oiling the brake-shaft and distance rod bearings on the rear axle of a motor vehicle.

My invention will be best understood by reference to the following description, when taken in connection with the accompanying drawings of one specific embodiment thereof, while its scope will be more particularly pointed out in the appended claims.

In the drawings.

Figure 1 is a generally horizontal, sectional view of a portion of the motor vehicle, including parts of the rear axle, one of the wheels, the brake mechanism, and the so-called distance rod, which carries the brake-operating mechanism, and in addition serves to maintain the proper fore and aft position of the rear axle with reference to the chassis frame;

Fig. 2 is a detail plan of a portion of the distance rod; and

Fig. 3 is a sectional view on line 3—3 of Fig. 1.

Referring to the drawings, and to the embodiment of my invention which is illustrated therein, I have shown an axle 4, on which is mounted a wheel 5 carrying one or more, herein two, brake-drums 6 and 7, the latter coöperating with an internal brake comprising a pair of brake shoes 8, normally held out of engagement with the brake-drum by springs 9. A brake-operating cam 10 is secured to a brake-operating shaft 11, the latter being journaled in a suitable bearing 12 carried by a generally horizontal distance rod 13, the latter having a bearing 14, in which the axle 4 is mounted to turn. This distance rod, sometimes called a radius rod, is customarily pivoted at its forward end to the chassis frame (not shown), and compels the axle to swing on an arc struck from the center of such pivot. This distance rod also forms a convenient support for the various parts of the brake mechanism, exclusive of the brake drums themselves, which are carried by the wheel. In some motor cars, these brake parts, however, are mounted on a support which, instead of being in the form of a radius rod, is rigidly secured to the rear axle housing, and the latter in turn is secured to a torque member, which receives the torsional stresses of the rear axle. My present invention is equally well adapted to either of these types of construction, and I have shown the distance rod type merely for purposes of exemplification.

Referring now to Figs. 2 and 3, I have shown common means for lubricating both of the bearings 13 and 14, the same including a generally horizontal duct 15, which connects said bearings to each other, said bearings being provided with chambers 16 and 17, forming reservoirs for the oil. Oil is supplied thereto by any suitable means, such for example as an oil cup 18, which may be and in the present instance does supply oil directly to the chamber 17, from whence oil flows laterally through the duct 15 and fills the chamber 16, as will be evident from an inspection of Fig. 3. As a means for feeding oil to the bearing surfaces, I have herein provided suitable wicks, comprising strips of felt 26 and 19, located in the chambers 16 and 17, respectively, and secured in place by rivets 20 and 21. These wicks feed oil from the lower portions of the reservoirs in an upward direction to additional wicks 22 and 23, which are in the form of plugs extending through suitable holes provided in bushings 24 and 25, encircling the shaft 11 and axle 4, respectively. By this means, oil is fed in a reliable, and yet economical, manner to the bearing surfaces of these parts. The supply can be very quickly and conveniently replenished from time to time, by opening the oil cup 18 and pouring oil in, until the entire system is filled. As time goes on, the supply will diminish, until the level recedes below the ends of the duct 15; but, however small a body remains in each, the wicks will continue to feed the same to the bearing surfaces. The convenience of this means of lubrication, and especially the capacity for lubricating both bearings by single means, will be readily appreciated by anyone who has been confronted with the unpleasant task of lubricating such parts of a motor vehicle.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. The combination of an axle, a support having a bearing in which said axle turns, brake mechanism including a shaft and a bearing in which said shaft is mounted, and common means for lubricating both of said bearings.

2. The combination of an axle, a distance rod having a bearing in which said axle turns, brake mechanism including a shaft mounted in a bearing carried by said distance rod, and common means for lubricating both of said bearings.

3. The combination of an axle, a distance rod having a bearing in which said axle turns, brake mechanism including a shaft mounted in a bearing carried by said distance rod, and an oil duct connecting said bearings to each other.

4. The combination of an axle, a distance rod having a bearing in which said axle turns, brake mechanism including a shaft mounted in a bearing carried by said distance rod, an oil duct connecting said bearings to each other, and means for supplying oil to said duct.

5. The combination of an axle, a distance rod having a bearing in which said axle turns, brake mechanism including a shaft mounted in a bearing carried by said distance rod, said bearings being provided with oil chambers, and a duct connecting said chambers to each other.

6. The combination of an axle, a distance rod having a bearing in which said axle turns, brake mechanism including a shaft mounted in a bearing carried by said distance rod, said bearings being provided with oil chambers, means for supplying oil to said chambers, and means for feeding oil by capillary action from the supply in said chambers to the bearings surfaces of said axle and said shaft.

7. The combination of an axle, a distance rod having a bearing in which said axle turns, brake mechanism including a shaft mounted in a bearing carried by said distance rod, said bearings being provided with oil chambers, a duct connecting said chambers to conduct oil from one to the other, means for supplying oil to said duct, and capillary oil feeding means in said chambers.

In testimony whereof I have signed my name to this specification.

DELMAR G. ROOS.